(12) United States Patent
Hollick et al.

(10) Patent No.: US 9,332,580 B2
(45) Date of Patent: May 3, 2016

(54) METHODS AND APPARATUS FOR FORMING AD-HOC NETWORKS AMONG HEADSET COMPUTERS SHARING AN IDENTIFIER

(71) Applicant: Kopin Corporation, Westborough, MA (US)

(72) Inventors: David Hollick, West Bridgford (GB); Christopher Parkinson, Richland, WA (US)

(73) Assignee: Kopin Corporation, Westborough, MA (US)

( * ) Notice: Subject to any disclaimer, the term of this patent is extended or adjusted under 35 U.S.C. 154(b) by 1 day.

(21) Appl. No.: 14/142,239

(22) Filed: Dec. 27, 2013

(65) Prior Publication Data

US 2014/0194065 A1 Jul. 10, 2014

Related U.S. Application Data

(60) Provisional application No. 61/749,138, filed on Jan. 4, 2013.

(51) Int. Cl.
*H04W 76/02* (2009.01)
*H04W 4/00* (2009.01)
*H04W 4/20* (2009.01)

(52) U.S. Cl.
CPC ............ *H04W 76/021* (2013.01); *H04W 4/008* (2013.01); *H04W 4/206* (2013.01)

(58) Field of Classification Search
None
See application file for complete search history.

(56) References Cited

U.S. PATENT DOCUMENTS

| | | |
|---|---|---|
| 5,990,793 A | 11/1999 | Bieback |
| 6,010,216 A | 1/2000 | Jesiek |
| 6,108,197 A | 8/2000 | Janik |
| 6,325,507 B1 | 12/2001 | Jannard et al. |
| 6,853,293 B2 | 2/2005 | Swartz et al. |
| 6,900,777 B1 | 5/2005 | Hebert et al. |
| 6,922,184 B2 | 7/2005 | Lawrence et al. |
| 6,956,614 B1 | 10/2005 | Quintana et al. |
| 6,966,647 B2 | 11/2005 | Jannard et al. |
| 7,004,582 B2 | 2/2006 | Jannard et al. |

(Continued)

FOREIGN PATENT DOCUMENTS

| | | |
|---|---|---|
| WO | WO 95/21408 | 8/1995 |
| WO | WO 2009/076016 A1 | 6/2009 |

(Continued)

OTHER PUBLICATIONS

International Search Report and the Written Opinion of the International Searching Authority, or the Declaration; PCT/US2013/078049, "Ad-Hoc Network", dated May 12, 2014.

(Continued)

*Primary Examiner* — Alejandro Rivero
(74) *Attorney, Agent, or Firm* — Hamilton, Brook, Smith & Reynolds, P.C.

(57) ABSTRACT

The invention is a mobile device collaboration framework (MDCF)—a form of communications framework, which enables devices to discover other devices that support the framework, access applications and services on those devices and exchange a variety of media and application-specific data. It is not tied to any one communications medium or protocol. It supports access restriction and data security at many levels. Sessions can involve multiple devices, creating subnets of devices, each with a shared purpose or task.

14 Claims, 5 Drawing Sheets

(56) References Cited

U.S. PATENT DOCUMENTS

| | | | |
|---|---|---|---|
| 7,013,009 B2 | 3/2006 | Warren | |
| 7,082,393 B2 | 7/2006 | Lahr | |
| 7,147,324 B2 | 12/2006 | Jannard et al. | |
| 7,150,526 B2 | 12/2006 | Jannard et al. | |
| 7,213,917 B2 | 5/2007 | Jannard et al. | |
| 7,216,973 B2 | 5/2007 | Jannard et al. | |
| 7,219,994 B2 | 5/2007 | Jannard et al. | |
| 7,231,038 B2 | 6/2007 | Warren | |
| 7,249,846 B2 | 7/2007 | Grand et al. | |
| 7,278,734 B2 | 10/2007 | Jannard et al. | |
| 7,331,666 B2 | 2/2008 | Swab et al. | |
| 7,445,332 B2 | 11/2008 | Jannard et al. | |
| 7,452,073 B2 | 11/2008 | Jannard et al. | |
| 7,458,682 B1 | 12/2008 | Lee | |
| 7,461,936 B2 | 12/2008 | Jannard | |
| 7,494,216 B2 | 2/2009 | Jannard et al. | |
| 7,512,414 B2 | 3/2009 | Jannard et al. | |
| 7,620,432 B2 | 11/2009 | Willins et al. | |
| 7,682,018 B2 | 3/2010 | Jannard | |
| 7,740,353 B2 | 6/2010 | Jannard | |
| 7,744,213 B2 | 6/2010 | Jannard et al. | |
| 7,760,898 B2 | 7/2010 | Howell et al. | |
| 7,806,525 B2 | 10/2010 | Howell et al. | |
| 7,959,084 B2 | 6/2011 | Wulff | |
| 7,966,189 B2 | 6/2011 | Le et al. | |
| 7,967,433 B2 | 6/2011 | Jannard et al. | |
| 7,969,383 B2 | 6/2011 | Eberl et al. | |
| 7,976,480 B2 | 7/2011 | Grajales et al. | |
| 7,988,283 B2 | 8/2011 | Jannard | |
| 8,010,156 B2 | 8/2011 | Warren | |
| 8,020,989 B2 | 9/2011 | Jannard et al. | |
| 8,025,398 B2 | 9/2011 | Jannard | |
| 8,072,393 B2 | 12/2011 | Riechel | |
| 8,092,011 B2 | 1/2012 | Sugihara et al. | |
| 8,140,197 B2 | 3/2012 | Lapidot et al. | |
| 8,212,859 B2 | 7/2012 | Tang et al. | |
| 2002/0015008 A1 | 2/2002 | Kishida et al. | |
| 2002/0094845 A1 | 7/2002 | Inasaka | |
| 2003/0068057 A1 | 4/2003 | Miller et al. | |
| 2003/0100274 A1* | 5/2003 | Brown | 455/90 |
| 2005/0135286 A1* | 6/2005 | Nurminen et al. | 370/310 |
| 2005/0264527 A1 | 12/2005 | Lin | |
| 2006/0132382 A1 | 6/2006 | Jannard | |
| 2006/0135064 A1 | 6/2006 | Cho et al. | |
| 2008/0198324 A1 | 8/2008 | Fuziak | |
| 2009/0128448 A1 | 5/2009 | Riechel | |
| 2009/0154719 A1 | 6/2009 | Wulff et al. | |
| 2010/0020229 A1 | 1/2010 | Hershey et al. | |
| 2010/0053069 A1 | 3/2010 | Tricoukes et al. | |
| 2010/0159976 A1* | 6/2010 | Marocchi | H04W 4/08 455/519 |
| 2010/0171680 A1 | 7/2010 | Lapidot et al. | |
| 2010/0238184 A1 | 9/2010 | Janicki | |
| 2010/0271587 A1 | 10/2010 | Pavlopoulos | |
| 2010/0277563 A1 | 11/2010 | Gupta et al. | |
| 2011/0001699 A1 | 1/2011 | Jacobsen et al. | |
| 2011/0089207 A1 | 4/2011 | Tricoukes et al. | |
| 2011/0090135 A1 | 4/2011 | Tricoukes et al. | |
| 2011/0214082 A1 | 9/2011 | Osterhout et al. | |
| 2011/0221669 A1 | 9/2011 | Shams et al. | |
| 2011/0221671 A1 | 9/2011 | King, III et al. | |
| 2011/0227812 A1 | 9/2011 | Haddick et al. | |
| 2011/0227813 A1 | 9/2011 | Haddick et al. | |
| 2011/0254698 A1 | 10/2011 | Eberl et al. | |
| 2011/0255050 A1 | 10/2011 | Jannard et al. | |
| 2012/0013843 A1 | 1/2012 | Jannard | |
| 2012/0056846 A1 | 3/2012 | Zaliva | |
| 2012/0062445 A1 | 3/2012 | Haddick et al. | |
| 2012/0105740 A1 | 5/2012 | Jannard et al. | |
| 2012/0114131 A1 | 5/2012 | Tricoukes et al. | |
| 2012/0202425 A1* | 8/2012 | Glezerman et al. | 455/41.2 |
| 2012/0322379 A1 | 12/2012 | Eun et al. | |

FOREIGN PATENT DOCUMENTS

| | | |
|---|---|---|
| WO | WO 2011/097226 A1 | 8/2011 |
| WO | WO 2012/040386 A1 | 3/2012 |

OTHER PUBLICATIONS

International Preliminary Report on Patentability for PCT/US2013/078049 dated Jul. 16, 2015 entitled "Methods and Apparatus for Forming Ad-Hoc Networks Among Headset Computers Sharing an Identifier".

* cited by examiner

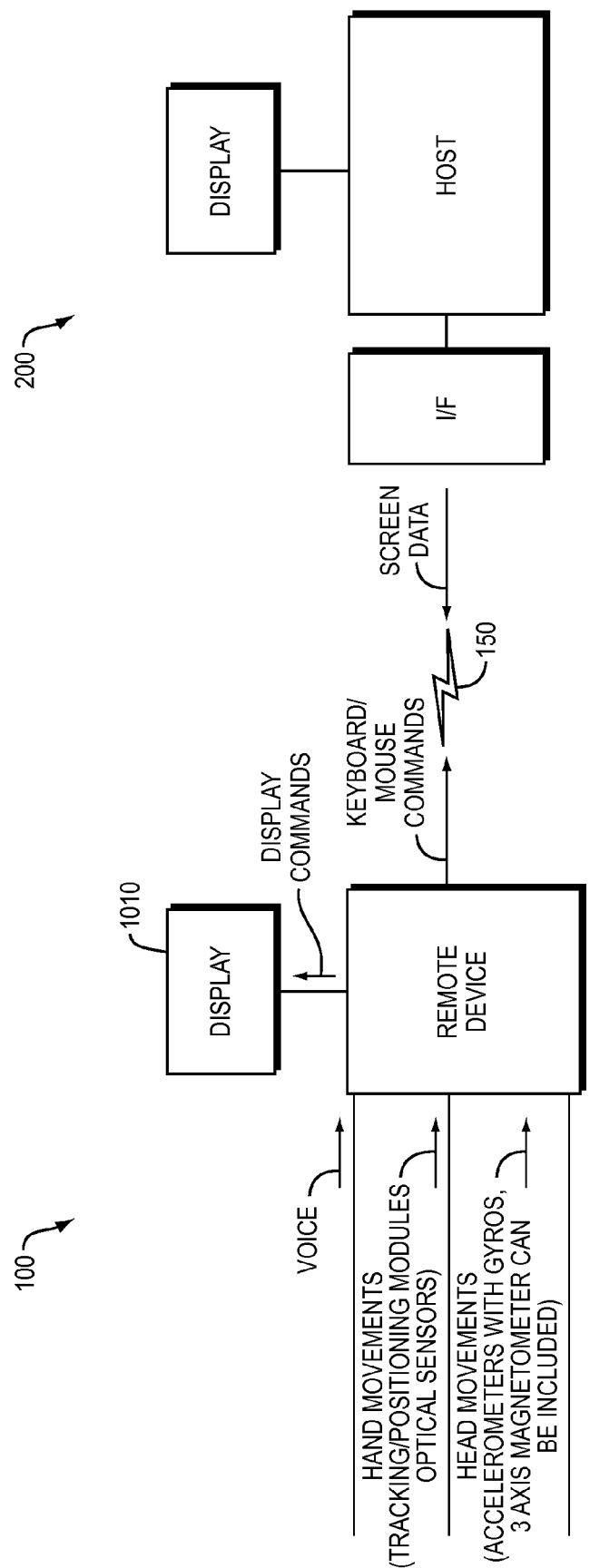

METHODS AND APPARATUS FOR FORMING AD-HOC NETWORKS AMONG HEADSET COMPUTERS SHARING AN IDENTIFIER

RELATED APPLICATION

This application claims the benefit of U.S. Provisional Application No. 61/749,138, filed on Jan. 4, 2013. The teachings of that application are incorporated herein in its entirety.

BACKGROUND OF THE INVENTION

Mobile computing devices, such as notebook PC's, smart phones, and tablet computing devices, are now common tools used for producing, analyzing, communicating, and consuming data in both business and personal life. Consumers continue to embrace a mobile digital lifestyle as the ease of access to digital information increases with high-speed wireless communications technologies becoming ubiquitous. Popular uses of mobile computing devices include displaying large amounts of high-resolution computer graphics information and video content, often wirelessly streamed to the device. While these devices typically include a display screen, the preferred visual experience of a high-resolution, large format display cannot be easily replicated in such mobile devices because the physical size of such device is limited to promote mobility. Another drawback of the aforementioned device types is that the user interface is hands-dependent, typically requiring a user to enter data or make selections using a keyboard (physical or virtual) or touch-screen display. As a result, consumers are now seeking a hands-free high-quality, portable, color display solution to augment or replace their hands-dependent mobile devices.

SUMMARY OF THE INVENTION

Recently developed micro-displays can provide large-format, high-resolution color pictures and streaming video in a very small form factor. One application for such displays can be integrated into a wireless headset computer worn on the head of the user with a display within the field of view of the user, similar in format to either eyeglasses, audio headset or video eyewear. A "wireless computing headset" device includes one or more small high-resolution micro-displays and optics to magnify the image. The WVGA microdisplays can provide super video graphics array (SVGA) (800×600) resolution or extended graphic arrays (XGA) (1024×768) or even higher resolutions. A wireless computing headset contains one or more wireless computing and communication interfaces, enabling data and streaming video capability, and provides greater convenience and mobility through hands dependent devices. For more information concerning such devices, see co-pending patent applications entitled "Mobile Wireless Display Software Platform for Controlling Other Systems and Devices," U.S. application Ser. No. 12/348,648 filed Jan. 5, 2009, "Handheld Wireless Display Devices Having High Resolution Display Suitable For Use as a Mobile Internet Device," PCT International Application No. PCT/US09/38601 filed Mar. 27, 2009, and "Improved Headset Computer," U.S. application Ser. No. 61/638,419 filed Apr. 25, 2012, each of which are incorporated herein by reference in their entirety.

Embodiments provide a framework that enables communications, control and data transfer between devices running the services. Embodiments allow context driven interaction between devices.

In a preferred embodiment the invention is a method of networking digital processing devices comprising (a) using a collaboration services module executed by a processor, detecting one or more devices within range, determining a factor in common amongst the detected devices in range of the processor, requesting the detected device to interact, and upon acceptance by the detected device, interacting the processor and the detected device, resulting in a network including the processor and the detected device; and (b) configuring the network to interact the processor and the detected device as a function of determined factor in common. In other embodiments the method is that described above in this paragraph (a) wherein the processor is a headset computer; (b) wherein the processor is a headset computer, and the factor in common is an activity identifier and the network is configured by determining applications, programs, services, and functions on the detected device that are shareable with and useable by the headset computer; (c) wherein the interacting enables communications, control and data transfer between the processor and the detected device; (d) wherein the interacting in configuring the network is context driven; (e) wherein the interacting between the processor and the detected device is over a wireless transport; (f) wherein the interacting between the processor and the detected device is over a wireless transport, and the wireless transport is any of BlueTooth, WiFi or other protocol; (g) wherein the network is formed of multiple detected devices and the processor; and (h) wherein the network is formed of multiple detected devices and the processor, and the multiple detected devices are headset computers.

In a preferred embodiment the invention is a computer apparatus networking digital processing devices comprising (a) a collaboration services module executed by a processor, the collaboration services module detecting one or more devices within range, determining a factor in common amongst the detected devices in range of the processor, and requesting the detected device to interact; and upon acceptance by the detected device, interacting the processor and the detected device, resulting in a network including the processor and the detected device; and (b) a device collaboration framework configuring the network to interact the processor and the detected device as a function of determined factor in common. In other embodiments the computer apparatus is that described above in this paragraph (a) wherein the processor is a headset computer; (b) wherein the processor is a headset computer and the factor in common is an activity identifier and the network is configured by determining applications, programs, services and functions on the detected device that are shareable with and useable by the headset computer; (c) wherein the interacting enables communications, control and data transfer between the processor and the detected device; (d) wherein the processor is a headset computer; (e) wherein the device collaborative framework configures the network in a context driven manner; (f) wherein network is formed of multiple detected devices and the processor; and (g) wherein network is formed of multiple detected devices and the processor and the multiple detected devices are headset computers.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale.

FIG. 2 is a block diagram of flow of data and control in the embodiments of FIGS. 1A and 1B.

DETAILED DESCRIPTION OF THE INVENTION

Figure 1A:
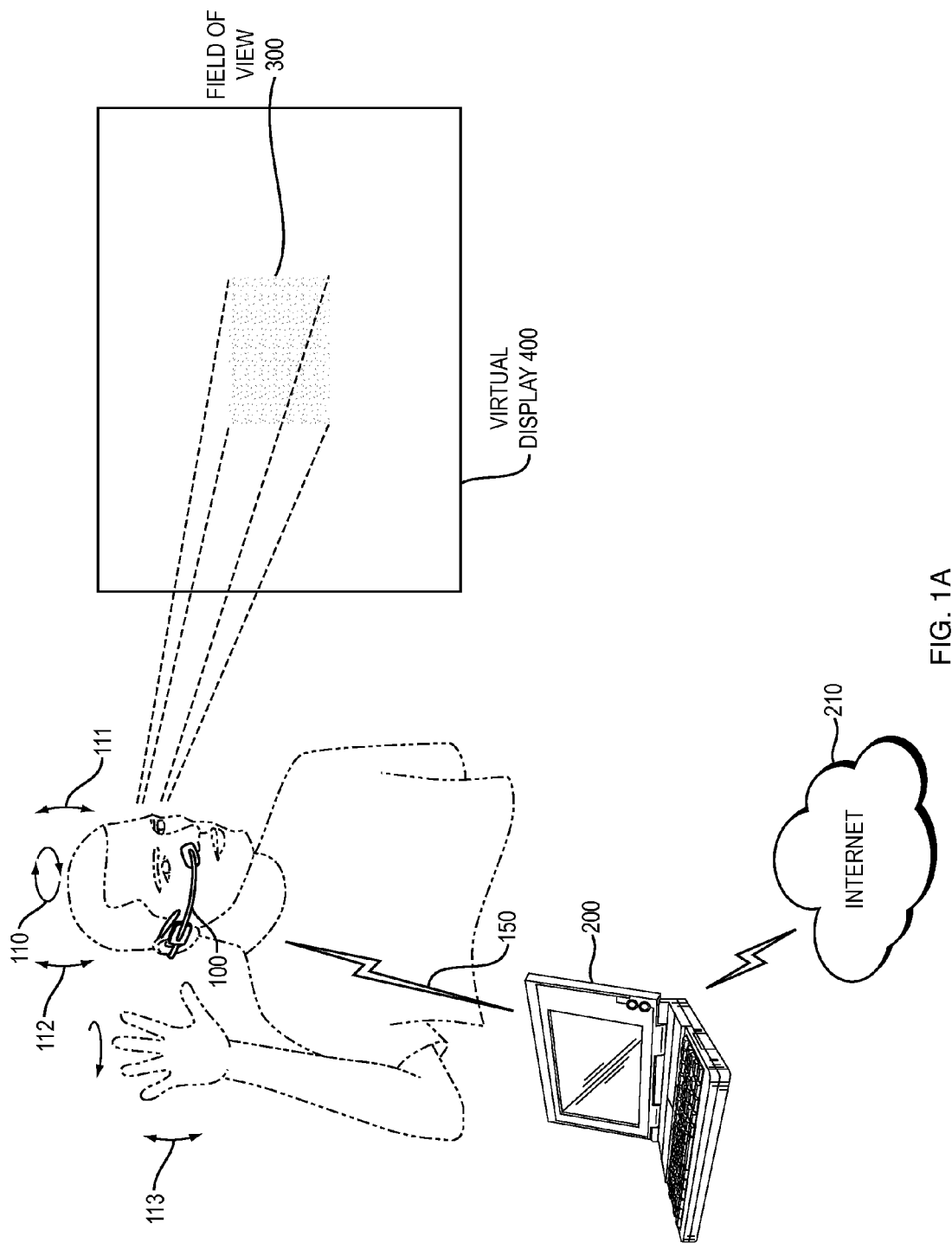
FIG. 1A is a schematic illustrations of a headset computer cooperating with a host computer (e.g., Smart Phone, laptop, etc.) according to principles of the present invention.
Figure 1B:
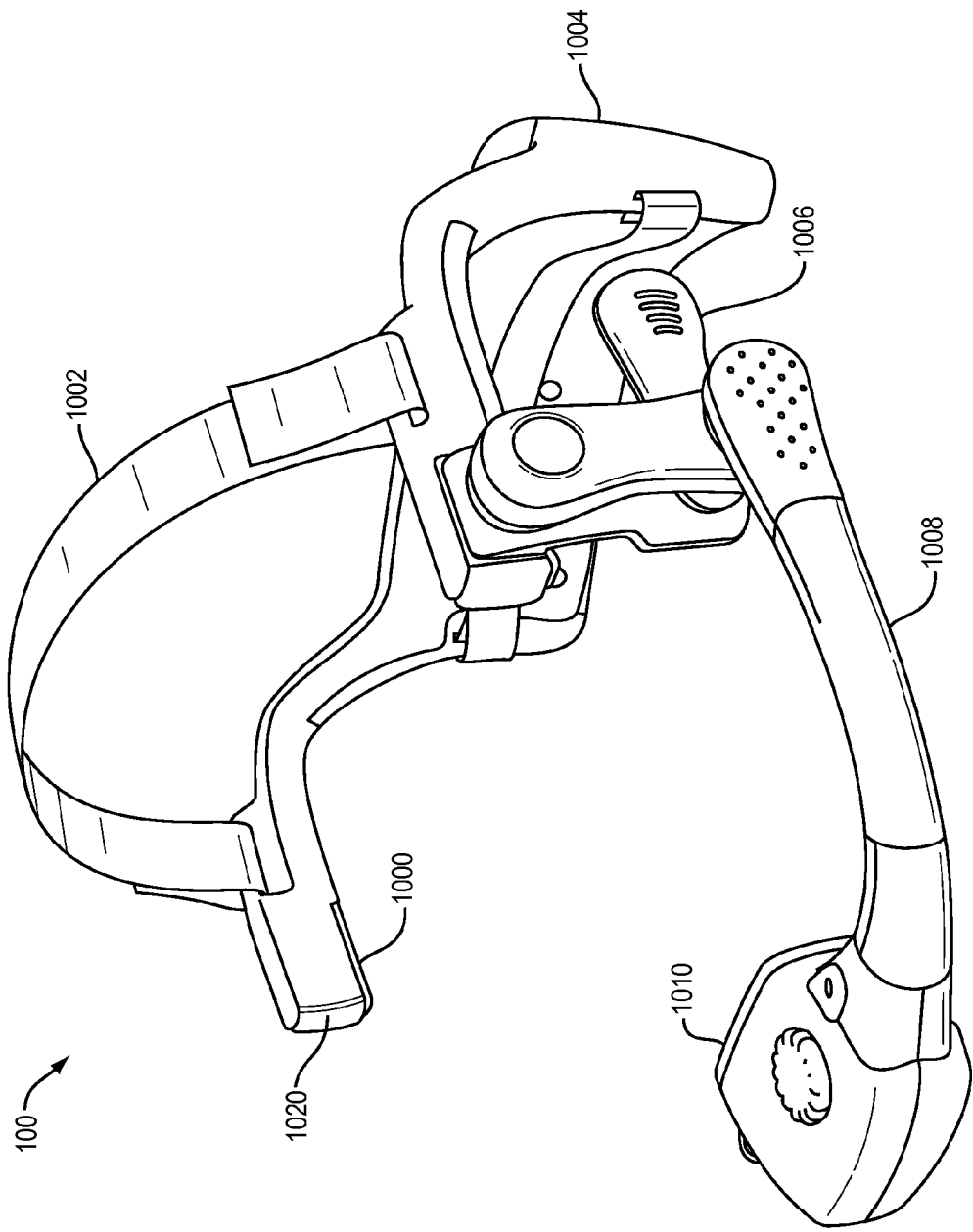
FIG. 1B is a schematic illustration of a headset computer according to aspects of the present invention.

FIGS. 1A and 1B show an example embodiment of a wireless computing headset device 100 (also referred to herein as a headset computer (HSC)) that incorporates a high-resolution (VGA or better) microdisplay element 1010, collaboration services (ad hoc network engine or agent) 3000 (shown in FIG. 3), and other features described below. HSC 100 can include audio input and/or output devices, including one or more microphones, input and output speakers, geo-positional sensors (GPS), three to nine axis degrees of freedom orientation sensors, atmospheric sensors, health condition sensors, digital compass, pressure sensors, environmental sensors, energy sensors, acceleration sensors, position, attitude, motion, velocity and/or optical sensors, cameras (visible light, infrared, etc.), multiple wireless radios, auxiliary lighting, rangefinders, or the like and/or an array of sensors embedded and/or integrated into the headset and/or attached to the device via one or more peripheral ports 1020 (shown in FIG. 1B). Typically located within the housing of headset computing device 100 are various electronic circuits including, a microcomputer (single or multicore processors), one or more wired and/or wireless communications interfaces, memory or storage devices, various sensors and a peripheral mount or mount, such as a "hot shoe" 1020.

Example embodiments of the HSC 100 can receive user input through sensing voice commands, head movements, 110, 111, 112 and hand gestures 113, or any combination thereof. Microphone(s) operatively coupled or preferably integrated into the HSC 100 can be used to capture speech commands which are then digitized and processed using automatic speech recognition techniques. Gyroscopes, accelerometers, and other micro-electromechanical system sensors can be integrated into the HSC 100 and used to track the user's head movement to provide user input commands. Cameras or other motion tracking sensors can be used to monitor a user's hand gestures for user input commands. Such a user interface overcomes the hands-dependent formats of other mobile devices.

The headset computing device 100 can be used in various ways. It can be used as a remote display for streaming video signals received from a remote host computing device 200 (shown in FIG. 1A). The host 200 may be, for example, a notebook PC, smart phone, tablet device, or other computing device having less or greater computational complexity than the wireless computing headset device 100, such as cloud-based network resources. The headset computing device 100 and host 200 can wirelessly communicate via one or more wireless protocols, such as Bluetooth®, Wi-Fi, WiMAX, 4G LTE or other wireless radio link 150. (Bluetooth is a registered trademark of Bluetooth Sig, Inc. of 5209 Lake Washington Boulevard, Kirkland, Wash. 98033.) In an example embodiment, the host 200 may be further connected to other networks, such as through a wireless connection to the Internet or other cloud-based network resources, so that the host 200 can act as a wireless relay. Alternatively, some example embodiments of the HSC 100 can wirelessly connect to the Internet and cloud-based network resources without the use of a host wireless relay.

FIG. 1B is a perspective view showing some details of an example embodiment of a headset computer 100. The example embodiment HSC 100 generally includes, a frame 1000, strap 1002, rear housing 1004, speaker 1006, cantilever, or alternatively referred to as an arm or boom 1008 with a built in microphone, and a micro-display subassembly 1010.

A head worn frame 1000 and strap 1002 are generally configured so that a user can wear the headset computer device 100 on the user's head. A housing 1004 is generally a low profile unit which houses the electronics, such as the microprocessor, memory or other storage device, along with other associated circuitry. Speakers 1006 provide audio output to the user so that the user can hear information. Micro-display subassembly 1010 is used to render visual information to the user. It is coupled to the arm 1008. The arm 1008 generally provides physical support such that the microdisplay subassembly is able to be positioned within the user's field of view 300 (FIG. 1A), preferably in front of the eye of the user or within its peripheral vision preferably slightly below or above the eye. Arm 1008 also provides the electrical or optical connections between the microdisplay subassembly 1010 and the control circuitry housed within housing unit 1004.

According to aspects that will be explained in more detail below, the HSC display device 100 allows a user to select a field of view 300 within a much larger area defined by a virtual display 400. The user can typically control the position, extent (e.g., X-Y or 3D range), and/or magnification of the field of view 300.

While what is shown in FIGS. 1A and 1B is a monocular microdisplay presenting a single fixed display element supported on the face of the user with a cantilevered boom, it should be understood that other mechanical configurations for the remote control display device 100 are possible.

FIG. 2 is a block diagram showing more detail of the HSC device 100, host 200 and the data that travels between them. The HSC device 100 receives vocal input from the user via the microphone, hand movements or body gestures via positional and orientation sensors, the camera or optical sensor(s), and head movement inputs via the head tracking circuitry such as 3 axis to 9 axis degrees of freedom orientational sensing. These are translated by software in the HSC device 100 into keyboard and/or mouse commands that are then sent over the Bluetooth or other wireless interface 150 to the host 200. The host 200 then interprets these translated commands in accordance with its own operating system/application software to perform various functions. Among the commands is one to select a field of view 300 within the virtual display 400 and return that selected screen data to the HSC device 100. Thus, it should be understood that a very large format virtual display area might be associated with application software or an operating system running on the host 200. However, only a portion of that large virtual display area 400 within the field of view 300 is returned to and actually displayed by the micro display 1010 of HSC device 100.

A Headset Computer (HSC) 100 in embodiments runs collaboration services (an ad hoc networking engine or agent) 3000, detailed in FIG. 3 below.

In one embodiment the HSC 100 may take the form of the HSC described in a co-pending U.S. Patent Publication Number 2011/0187640 which is hereby incorporated by reference in its entirety.

In another embodiment, the invention relates to the concept of using a Head Mounted Display (HMD) 1010 in conjunction with an external 'smart' device 200 (such as a smartphone or tablet) to provide information and control to the user hands-free. The invention requires transmission of small amounts of data, providing a more reliable data transfer method running in real-time.

In this sense therefore, the amount of data to be transmitted over the connection 150 is small—simply instructions on how to lay out a screen, which text to display, and other stylistic information such as drawing arrows, or the background colors, images to include, etc.

Additional data could be streamed over the same 150 or another connection and displayed on screen 1010, such as a video stream if required by the Controller 200.

The collaboration framework is a service 3000 that runs on multiple devices such as mobile devices, computer systems such as laptops and desktops and other devices. In embodiments, the collaboration service 3000 runs on multiple HSCs 100 and hosts 200.

There are two main functions of the framework 3000. The first relates to connection of devices, such as 100, 200 described above in FIGS. 1A, 1B, and 2. Using a series of announcements and discoveries, the framework develops and maintains a real-time list of devices that are 'in range' (accessible on a common network infrastructure e.g., a subnet) and that are running the same collaboration service 3000. The collaboration services 3000 enable devices 100, 200 to detect the functionality available on other devices 100, 200 such as video conferencing capabilities, or specific software that is available. There may also be customizable permission levels and security.

In this context, devices 100, 200 being 'in range' of each other means accessible by any communications medium and protocol available to the device, subject to necessary communications support software being installed. The information exchanged in this discovery process includes details of the applications and services available on each device. Examples could include video conferencing capabilities, or specific applications related to a specific activity. All information exchanged can be limited by a multi-level access control mechanism that covers the activity concerned as well as the user, their role, device, group, organization and location.

The second function of the collaboration services framework relates to device 100, 200 interaction. For example, a device might see that another device has a camera and video chat software, and then can send out a request to start a video chat session. The other device can accept or reject this request.

Restated, the second function of the framework 3000 relates to use of the applications and services enumerated by the discovery process. The framework/collaboration services 3000 enable one device to request actions by other devices it has discovered. Possible examples include instigating an audio-video call with the user of another device, accessing data from a sensor attached to another device, and sharing a document. The framework does not limit or specify the applications and services that could be created to make use of it.

The chief advantage to the user is that the framework/collaboration services 3000 handle all of the connection details such as working out device IP addresses, security, etc. Based on the position of the user in that specific framework context (user role, etc.), the user can easily interact with other devices or users, gaining information in a controlled way.

Figure 3:
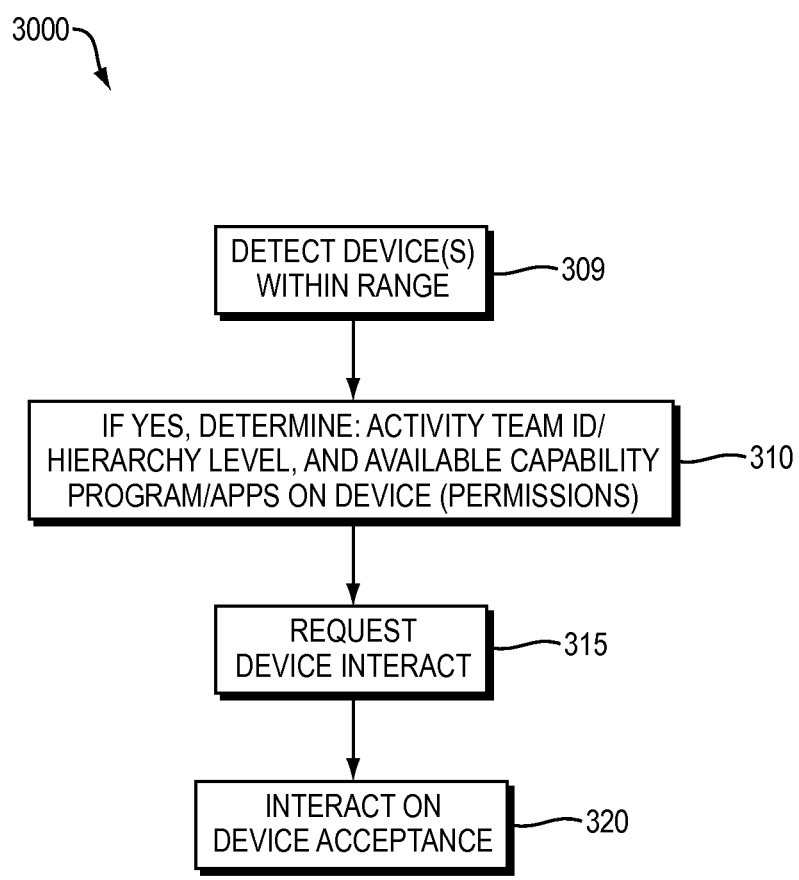
FIG. 3 is a flow diagram of collaboration services in embodiments of the present invention.

FIG. 3 is a flowchart illustrative of implementation by Host 200 and HSC 100 executing collaboration services 3000.

The collaboration services module 3000 running on host 200 and/or HSC 100 first detects other devices 100, 200 within range (step 309). If a device is detected to be within range then step 310 determines available capability of the detected device. This includes determining program applications and permissions thereof on the detected device. After the determination at step 310, the collaboration services module 3000 prepares and transmits a request 315 for device interaction (for interaction with the detected device). Upon the detected device responding in the positive to the request of 315, the collaboration services step 320 enables and provides interaction between the detected device and Host 200 or HSC 100 executing the collaboration services 3000.

Figure 4:
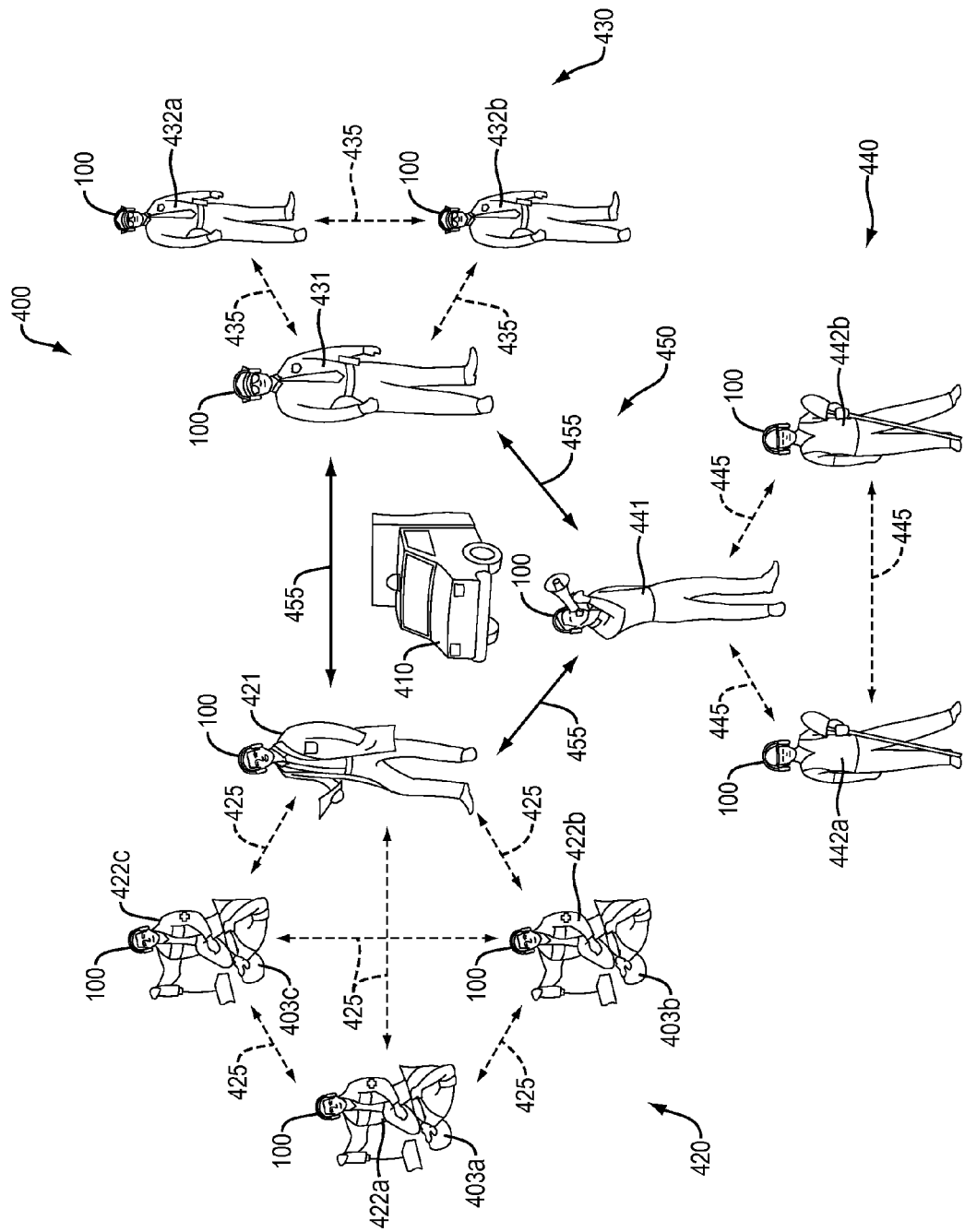
FIG. 4 is a diagram of ad hoc communications networks and subnetworks being formed among headset computers worn by responders to an incident.

FIG. 4 provides an example of ad hoc networks according to the present invention being used to facilitate communication among teams and team members wearing HSCs 100. An ambulance 410 arrives at a large incident 400 where there are three victims 403a, 403b, 403c and members of the public (not shown) are watching out of curiosity. On scene are a medical team 420, comprising a consultant 421 and three paramedics 422a, 422b, 422c; a police team 430, comprising a sergeant 431 and two police officers 432a, 432b; and a repair team 440, comprising a foreman 441 and two road crewmen, 442a, 442b.

At incident 400, each of the teams 420, 430, 440 is responsible for a primary activity. The medical team 420 is responsible for performing medical activities, including managing the care of the victims 403a, 403b, 403c, medically assessing the victims, helping the victims, accessing records, sending diagnostic data, and stabilizing the victims for transport. The police team 430 is responsible for performing investigation activities (not shown), such as securing the scene, talking to witnesses, accessing vehicle records, conducting an investigation, and providing traffic control. The repair team 440 is responsible for performing repair activities (not shown), including repairing damaged road equipment, property, buildings, material, phone poles, and other infrastructure.

Coordination of activities among the teams is important. For example, the repair team 440 needs to liaise with the police team 430 and medical team 420 to effect the repairs. Accordingly, the teams are collectively responsible for coordination activities, in addition to their primary activities, to ensure the teams work together and don't interfere with the others' work. This responsibility is vested in a coordination team 450 comprising the medical consultant 421, police sergeant 431, and crew boss 441.

Communication, data sharing, and other functions within and among these teams 420, 430, 440, 450 is essential to the teams' being able to perform their medical activities, police activities, repair activities, and coordination activities. This communication is provided according to aspects of the present invention, wherein members of the teams 420, 430, 440, 450 wear headset computers HSC 100 and these headset computers associate with each other in ad hoc networks.

Network connectivity may be provided by the ambulance 410 that hosts a wide area Wi-fi network and/or individual ones (Wi-fi networks) of HSCs 100. Connected to the Wi-fi network are the sergeant 431, two police officers 432a, 432b, medical consultant 421, three paramedics 422a, 422b, 422c, repair crew foreman 441, and two road crewmen, 442a, 442b.

The ad hoc networks are organized with consideration given to the classes of activities being performed at site 400:

medical, police, repair, and coordination. Accordingly, 4 MDCF (mobile device collaboration framework) activity networks, all subsets of the overall MDCF network, are established to link the headsets HSC 100 of users that are involved in those activities. Each MDCF network is in turn a subset of the Wi-fi network. In this manner, headsets HSC 100 worn by members of medical team 420 are linked via MDCF 425; headsets HSC 100 worn by members of police team 430 are linked via MDCF 435; headsets HSC 100 worn by members of repair team 440 are linked via MDCF 445; and headsets HSC 100 worn by members 421, 431, 441 of coordination team 450 are linked via MDCF 455.

Members' headset computers have processors running collaboration services modules 3000. These modules detect whether certain other devices are in range. The modules can also detect other aspects of other users' devices that can allow for selective, intelligent, or secure formation of networks and subnetworks, based on a variety of factors. These factors could include physical proximity of two devices as determined, for example, by GPS positioning data. Another factor could be unique identifiers associated with headset computers worn by members of, for example, the police team 430 to identify the headsets as police team headsets 100, and a different identifier is associated with the medical team HSCs 100.

For example, HSC 100 worn by police sergeant 431 has a collaboration services module 3000 executed by a processor. The module detects that policemen 432*a* and 432*b* are within communications range, and are further within a certain physical proximity as determined by GPS data. The module 3000 also determines that policemens' 432*a* and 432*b* headsets HSC 100 share a common (police) identifier with that of the sergeant. Based on physical proximity, commonality of identifier, or both, HSC 100s of sergeant 431 and policemen 432*a* and 432*b* are associated in a subnet, such as MDCF 435, by the request-accept process of FIG. 3.

Within the subnet MDCF module 3000 enables each involved headset 100 to discover applications, features, functions/capabilities on the other headsets 100 of the subnetwork 435. With the results of this discovery, each headset 100 in subnetwork MDCF 435 has a means of sharing the applications, programs, features and functions of the subnetwork as if loaded directly on the headset. Consequently, each HSC 100 of a team 430 does not need to necessarily be configured with the same programs, functionality, etc., knowing that sharing of such is made available by subnetwork 435 communications.

Likewise, HSC 100 worn by medical director 421 executes collaboration services module 3000. The module detects that paramedics 422*a,b,c* headsets 100 are within range and share a common (medical team) identifier with medical director 421's HSC 100. Based on these factors, HSCs 100 of medical director 421 and paramedics 422*a,b,c* are associated in subnetwork MDCF 425. Within the subnetwork 425, module 3000 enables each involved headset 100 to discover and share applications, programs, features, functions, etc. on the other headsets of subnetwork 425.

Similarly, HSC 100 worn by crew foreman 441 executes collaboration services module 3000. The module detects that road crewmen's 442*a,b*'s headsets 100 are within range and share a common (repair crew) identifier with crew foreman 441's HSC 100. Based on these factors, HSCs 100 of crew boss 441 and road crewmen 442*a,b* are associated in subnetwork MDCF 445. Within the subnetwork 445, module 3000 enables each involved headset 100 to discover and share applications, programs, features, functions, etc. on the other headsets of subnetwork 445.

The module in HSC 100 of the police sergeant 431 determines that other devices are within range, such as for example, that of medical director 421. Further, based on commonality of an identifier in HSC 100 (the sergeant 431 and the medical director 421 both being members of the coordination team 450, for example), the module 3000 joins the police sergeant and medical director in a subnet such as collaboration network MDCF 455. Where HSC 100 of the medical director 421 and police sergeant 431 do not share a common identifier, module 3000 does not discover and share applications, functions, etc. as in subnet 435 but rather allows certain communications and cooperation defined for this subnetwork 455. The module 3000 keeps track of devices as they go in and out of range, as personnel arrive and depart from the scene 400.

Note that the medical consultant 421, the police sergeant 431, and the repair crew boss 441 are each part of two MDCF activity networks, corresponding to their area of operations and overall coordination.

Each of the separate MDCF activity networks 425, 435, 445, 455 provides a number of features to the members, including targeted, secure communications, activity-specific applications, session (incident) management, and protection from deliberate or inadvertent interference and snooping. Some of the applications and programs on the medical director's HSC 100 are not loaded on the HSCs 100 of the police team 430 or repair team 440. Likewise, some of the applications, programs and communications frequencies, etc. on the police team's HSCs 100 are not on the medical teams 420's or repair team 400's HSCs 100; and similarly, for programs, features, etc. of the HSCs 100 of the repair team 440 as compared to HSCs 100 of the medical team 420 and police team 430. MDCF 3000 also supports the use of multiple concurrent communication interfaces and enhanced networking capabilities such as mesh networking. For example, the medical team 420 could use mesh networking to optimize communications among them as they roam the scene of the incident.

Importantly, a device 100 of a member of one team 420, 430, 440, 450 in a respective MDCF activity network 425, 435, 445, 455 may advantageously use program applications, features, and/or data from a device 100 of a member of another team/respective MDCF activity network. For example, policeman 432*a* has a headset computer 100 in communication with that of Police Sergeant 431 via MDCF activity network 455. Policeman 432*a* in his duties at scene 400 investigates identities of victims 403*a, b, c*. In his on the scene investigation, policeman 432*a* makes a positive ID of victim 403*c* using police and other records accessed using policemen's HSC 100 and programs operated thereon. Such data access from the field is supported by a host processor at ambulance 410 and communications through MDCF subnetwork 435. Policeman 432*a* makes the positive identification and other pertinent facts (say for example medical information) of victim 403*c* known to police sergeant 431 by forwarding data from policemen's HSC 100 to police sergeant's HSC 100 via MDCF subnetwork 435. When police sergeant 431's HSC 100 is also part of the collaboration network 455, the forwarded data about victim 403*c* becomes available to the collaboration team's 450 (i.e., medical director 421, police sergeant 431, and crew boss 441) respective HSCs 100. In turn, from the medical director's HSC 100, the forwarded data is accessible (or able to be communicated) to paramedic 422*c*'s HSC 100. The MDCF activity network 425 supports the data transport/communication and sharing. In this example, the forwarded data may be, for example, information on victims 403*c*'s blood type, prior recorded medical conditions, drug allergies, etc. In this way, information (generated by a certain application or program) is easily and efficiently shared between teams 430, 420 and related across MDCF network/subnetworks 435, 455 and 425, for use by the crucial team member (e.g., paramedic 422c) where is HSC 100 is not so programmed (not equipped with a certain application or program).

In another aspect, and again with reference to FIG. 4, HSCs 100 of members of the police team 420 are equipped with a module that can determine the position of the headset relative to fixed coordinates (e.g., the earth, by using, for example, a global positioning system (GPS) module) or relative to another object (e.g., the ambulance, the headset of another user, or the concentration center of a group of HSCs 100). For example, when policeman 432b arrives on scene 400, a processor in his headset 100 determines, based on position data from the GPS module in his headset, that he is within 100 yards of police sergeant 431 (who also has a headset with a GPS module). Accordingly, based on physical proximity, the accept-request process of FIG. 3 is initiated, and the HSCs 100 of the sergeant 431 and policeman 432b join in a network, e.g., subnetwork 435.

When medical director 421 arrives at scene 400, his HSC 100 determines (using GPS location data) that he is also within a threshold distance from police sergeant 431, e.g., 100 yards. Accordingly, his HSC 100 joins the subnetwork 455. These threshold distances can be predetermined and programmed into the headsets HSC 100. When medical director 421 leaves the scene 410, subnetwork 425 is maintained by the HSC 100 of paramedic 422c acting as a proxy.

Identifiers associated with the various HSCs 100 can be used to convey a multitude of information about the permissions, access, and connectivity available to and from a given HSC 100, the networks and subnetworks which that HSC 100 can join, the order in which it will join those networks and subnetworks, and so on, as well to convey hierarchies of priority, permissions, and proxies for various HSCs 100. For example, an identifier associated the HSC 100 of police sergeant 431 could identify him as belonging to police team 430 and having a hierarchical or functional rank corresponding to his duties as sergeant. Thus, his HSC 100 might be assigned the identifier "P-3", where the "P" identifies as a member of the police team, and the "3" identifies a rank of sergeant. A police lieutenant, captain, and deputy chief, might, under this same scheme, have HSCs 100 identified as P-4, P-5, and P-6, respectively, with the rising number after the "P" corresponding to increasing rank. The identifier associated the HSC 100 of policeman 432a under this scheme might be "P-2' (if a senior police officer), and 432b might be "P-1" (if a junior officer). Additional information could be included in an identifier string, such as whether the individual associated with that HSC 100 (or with the account that is logged in at that HSC 100) has permission to view classified or sensitive information. For example, in an expanded identifier string scheme, a third digit could be added, such as "a," "b", "c," and "x", corresponding to no security clearance, clearance to see confidential information, clearance to see secret/sensitive material, and top secret clearance, respectively.

Accordingly, police sergeant 431's HSC 100 might have the identifier "P-3-b" with the last digit indicating that he can see confidential information, such as personnel reports, certain sensitive databases, and so on. Suppose that policeman 432a's HSC 100 has an expanded identifier of "P-2-a." Subnetwork 435 can be configured to block access from the headset of policeman 432a to "b" level content on the HSC 100 of police sergeant 431, while permitting access to other applications, programs, content, and so on that does not require any security clearance.

Continuing with the example of the police sergeant 431 and the policeman 432a, when sergeant 431 leaves the scene, functions performed by the HSC 100 of his HSC 100 can be transferred to another HSC 100, such as for example, the HSC 100 of the individual on scene having the next lower rank in the police hierarchy; in this example, this would be (senior) policeman 432a, whose HSC 100 has an identifier of "P-2-a", the middle digit "2" being subordinate and next lower in rank to that of the sergeant 431 (having identifier "P-3-b.") The transferred functions can include the role within the subnetwork 430 (police network), within the coordination network 450, or both. As people leave the scene, subnetworks can be rearranged. For example, if only policemen 432a,b crewman 422b, and paramedic 403b remain on scene, then coordination might best be achieved by joining all of these users' HSCs 100 in single network, the complexity of subnetworks no longer being required. Conversely, in a situation with a very large number of individuals, multiples levels of subnetworks could be established (i.e., networks within networks within networks, and so on).

It should be further appreciated that the ad hoc nature of the alliances of the HSCs 100 of various individuals, each having identifiers corresponding to roles and/or ranks within those roles can, in some embodiments, be subjected to a confirmation process within the HSCs 100 of users or at a central location For example, users of HSC 100s can be given the option of joining a particular network or subnetwork, prior being joined. In addition, users of HSCs 100, such as prime users, can be given the option of denying or other modifying the access level of HSCs 100 within range. For example, a deputy chief might arrive at scene 400 in a mobile command station. Using a computer workstation in the command vehicle, the deputy chief opens a computer application that maps the ad hoc network that has been formed by the various HSCs 100 on the scene. The image displayed to him on the screen of the workstation could be similar to that shown in FIG. 4, i.e., a diagram showing the individuals and the networks or subnetworks. In some embodiments, the display would also provide GPS coordinates. Using this computer application, the deputy chief starts to manually modify the ad hoc networks by adding or removing users' HSCs 100 from those networks. This can be done to maximize efficiency of the operation and/or performance of the networks or subnetworks, such as by reducing burden, conserving bandwidth, allocating resource most efficiently, and so on. For example, the deputy chief might order policeman 432a to head down the street to direct traffic away from the vicinity of the site. In this new role, policeman 432a does not require connectivity to network 435, but his HSC 100 is still within range of the Wi-Fi from ambulance 410, so the deputy chief manually excludes him from the subnetwork using the control application on his computer workstation. In this manner, network resources are conserved.

While the methods and systems of networking have been explained herein in relation principally to HSC 100, it should be appreciate that they can be applied more generally to network any digital processing devices.

While this invention has been particularly shown and described with references to example embodiments thereof, it will be understood by those skilled in the art that various changes in form and details may be made therein without departing from the scope of the invention encompassed by the appended claims.

What is claimed is:

1. A method of networking digital processing devices comprising:
   (a) using a collaboration services module executed by a processor:
      detecting two or more devices within range of the processor;
      determining a factor in common amongst the two or more detected devices, wherein the determined factor in common is an identifier indicating at least one of an activity and a role associated with users of the two or more detected devices;
      requesting the two or more detected devices to interact; and
      upon acceptance by the two or more detected devices, interacting the processor and the two or more detected devices, resulting in a network including the processor and the two or more detected devices;
   (b) configuring the network to interact the processor and the two or more detected devices as a function of the determined factor in common, such that one or more subnetworks are established based on the at least one of the activity and the role associated with users of the two or more detected devices; and
   (c) maintaining the one or more subnetworks upon removal of the processor from within range of the two or more detected devices, at least one of the two or more devices acting as a proxy for the removed processor.

2. The method of claim 1, wherein the processor is a headset computer.

3. The method of claim 2, wherein the factor in common is an activity identifier and the network is configured by determining applications, programs, services, and functions on the two or more detected devices that are shareable with and useable by the headset computer.

4. The method of claim 1, wherein the interacting enables communications, control and data transfer between the processor and the two or more detected devices.

5. The method of claim 1 wherein the interacting in configuring the network is context driven.

6. The method of claim 1, wherein the interacting between the processor and the two or more detected devices is over a wireless transport.

7. The method of claim 6, wherein the wireless transport is any of BlueTooth, WiFi or other protocol.

8. The method of claim 1, wherein the two or more detected devices are headset computers.

9. A computer apparatus for networking digital processing devices comprising:
   a processor;
   a collaboration services module executed by the processor, the collaboration services module:
      detecting two or more devices within range of the processor,
      determining a factor in common amongst the two or more detected devices, wherein the determined factor in common is an identifier indicating at least one of an activity and a role associated with users of the two or more detected devices,
      requesting the two or more detected devices to interact, and
      upon acceptance by the two or more detected devices, interacting the processor and the two or more detected devices, resulting in a network including the processor and the two or more detected devices; and
   a device collaboration framework executed by the processor, the device collaboration framework configuring the network to interact the processor and the two or more detected devices as a function of the determined factor in common, such that one or more subnetworks are established based on the at least one of the activity and the role associated with users of the two or more detected devices, wherein the one or more subnetworks are maintained upon removal of the processor from within range of the two or more detected devices, the device collaboration framework designating at least one of the two or more devices to act as a proxy for the removed processor.

10. The computer apparatus of claim 9, wherein the processor is a headset computer.

11. The computer apparatus of claim 10, wherein the factor in common is an activity identifier and the network is configured by determining applications, programs, services and functions on the two or more detected devices that are shareable with and useable by the headset computer.

12. The computer apparatus of claim 9, wherein the interacting enables communications, control and data transfer between the processor and the two or more detected devices.

13. The computer apparatus of claim 9, wherein the device collaboration framework configures the network in a context driven manner.

14. The computer apparatus of claim 9, wherein the two or more detected devices are headset computers.

* * * * *